United States Patent

Paljug et al.

[15] 3,652,934
[45] Mar. 28, 1972

[54] LOG/LINEAR ELECTROMETER

[72] Inventors: Joseph W. Paljug, Falls Church; Samuel S. Brody, Springfield, both of Va.

[73] Assignee: American Standard Inc., Falls Church, Va.

[22] Filed: Aug. 5, 1969

[21] Appl. No.: 847,694

[52] U.S. Cl. ............................324/115, 324/123 R, 324/132
[51] Int. Cl. ...................................G01r 15/08, G01r 15/10
[58] Field of Search ......................324/115, 123, 132, 99, 74, 324/119; 328/127; 307/230; 330/23

[56] References Cited

UNITED STATES PATENTS

| | | | |
|---|---|---|---|
| 2,870,408 | 1/1959 | Draganjac | 324/115 |
| 3,321,628 | 5/1967 | Webb | 324/123 X |
| 3,363,177 | 1/1968 | Houghton | 324/123 |
| 3,368,149 | 2/1968 | Wasserman | 324/99 |
| 3,479,593 | 11/1969 | Dissing et al. | 324/123 |
| 3,028,473 | 4/1962 | Dyer et al. | 330/23 X |
| 3,037,129 | 5/1962 | Le Bel | 330/23 X |
| 3,135,918 | 6/1964 | Bergson | 324/123 X |
| 3,187,323 | 6/1965 | Flood et al. | 324/115 X |
| 3,222,600 | 12/1965 | Gewirtz | 324/123 |
| 3,237,028 | 2/1966 | Gibbons | 324/123 |
| 3,390,329 | 6/1968 | Gewirtz | 324/123 |
| 3,486,112 | 12/1969 | Bayer | 324/74 X |
| 3,529,240 | 9/1970 | Sanders | 324/119 X |

Primary Examiner—Rudolph V. Rolinec
Assistant Examiner—Ernest F. Karlsen
Attorney—Hurvitz, Rose & Greene

[57] ABSTRACT

A high impedance, solid state log-linear amplifier (electrometer) of drift free repeatable character includes a multiple range linear amplifier and a logarithmic amplifier continuously adjustable to accept several decades of input current. The overall unit includes an internal calibration source and has a pair of output ports which are separately adjustable relative to the input current to provide dual readout for a single input as where one readout is to be interfaced into a computer while the other readout is to provide a visual entry on a strip chart recorder.

12 Claims, 1 Drawing Figure

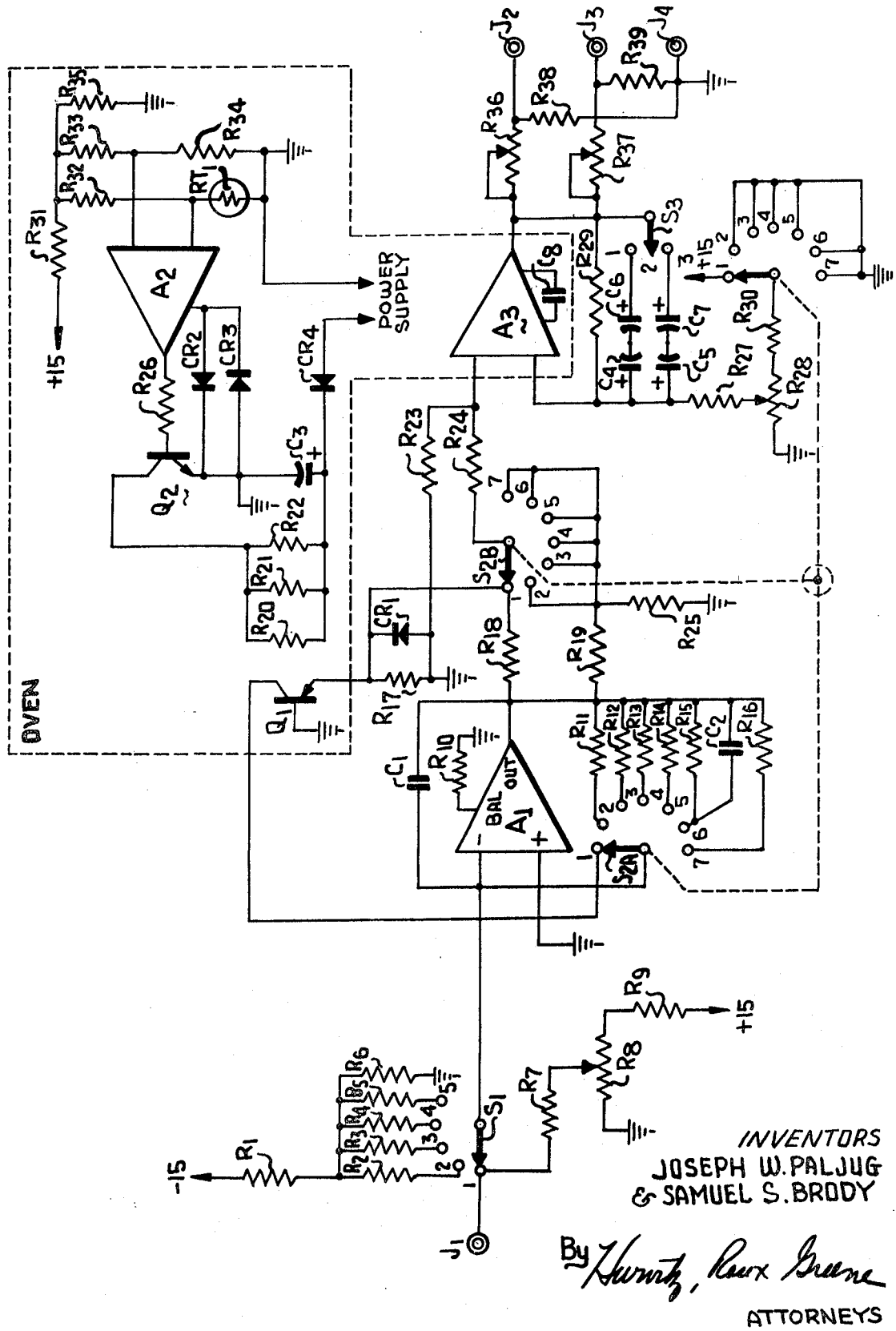

LOG/LINEAR ELECTROMETER

BACKGROUND OF THE INVENTION

The present invention resides generally in the field of electrometer amplifiers, and is more particularly directed to a highly stable solid state electrometer amplifier especially adapted for use in air pollution monitoring and analysis systems.

The present invention is the result of a need for an electrometer amplifier of unusual stability with virtually no zero point drift and capable of providing both logarithmic and linear readout, for use in an air pollution analysis system and specifically in a sulfur dioxide ($SO_2$) analyzer. In the development effort relating to such an analyzer, it was found that no commercially available amplifier or electrometer amplifier had the characteristics or combination of characteristics required to provide the necessary analysis of air pollution, nor could a suitable amplifier be found in any of the prior art publications.

The principal characteristics required of an amplifier for the $SO_2$ analysis system were as follows:

a. a drift free logarithmic amplifier with high repeatability;

b. a multiple range linear amplifier;

c. a logarithmic amplifier continuously adjustable to accommodate from two to six decades of input current, i.e., in which the output may be scaled for input currents of $10^{-10}$ to $10^{-4}$ amperes as a maximum range and from $10^{-8}$ to $10^{-6}$ as a minimum range;

d. the inclusion of an internal calibration source by which to check the accuracy of the previously specified ranges of the instrument;

e. the provision of dual output ports by which the two outputs are separately adjustable relative to the input current; and f. wide dynamic range with high resolution of output signal.

Accordingly, it is the principal object of the present invention to provide an improved electrometer amplifier suitable to provide logarithmic and linear readout functions.

SUMMARY OF THE INVENTION

Briefly, according to the present invention, an electrometer amplifier system usable in either a logarithmic or a linear gain characteristic mode includes a pair of cascaded high-gain operational amplifiers. Each amplifier is provided with its own feedback circuit, the first amplifier stage having in its feedback circuit a transistor supplying the desired logarithmic characteristic. A selector switch is provided to switch from feedback along the logarithmic characteristic-setting path, to feedback via any of a plurality of linear amplification-setting paths. Sufficient buckout current adjustment is also provided at the input of the first amplifier stage to permit reduction of undesirable background noise on the input signal. The logarithmic gain characteristic-determining transistor is maintained in a fixed temperature environment to prevent the existence of offset voltages that vary with temperature. However, offset voltage cancellation is provided for signal applied to the second amplifier stage by means of a separate adjustable current source. Dual readout terminals are also provided, with independently adjustable ranges, to permit separate or simultaneous measurement (on different scales) of input signal.

BRIEF DESCRIPTION OF THE DRAWING

The sole FIGURE of drawing is a schematic diagram of a preferred embodiment of the electrometer amplifier system.

DESCRIPTION OF THE PREFERRED EMBODIMENT

Referring now to the sole FIGURE of drawing, a shielded input terminal J1 is available to have connected thereto an input signal constituting a negative current. The movable arm of switch S1 is arranged to electrically connect with any of a plurality of electrical contacts numbered 1 through 5. Movement of the switch arm to contact any of the four terminals 2–5 permits selection of a respective one of four possible calibration currents to the input terminal of an amplifier A1 via respective resistances R2, R3, R4 and R5 connected at a common end via another resistance R1 to a source of negative potential herein indicated to be −15 volts. Movement of the switch arm of S1 into the contact with terminal 1 supplies the input current at terminal J1 to the negative input terminal of amplifier A1 and also allows the insertion of a bucking current of selected magnitude by appropriate adjustment of the movable tap on rheostat R8 from a positive voltage source (here designated as +15 volts) connected through resistance R9, pot R8 and resistance R7 to contact 1. The bucking current permits relatively high level background currents on the input signal to be reduced in magnitude for greater amplification of small signals.

Amplifier A1 is a high gain operational amplifier of a commercially available type, having a negative input terminal, a positive input terminal (which is connected to a point of reference potential, ground in the embodiment of FIG. 1), a balance terminal (also connected to a source of ground potential, via a resistance R10), and an output terminal. A switch S2, having ganged arms S2A, S2B, and S2C, permits selection of either of two modes of operation of amplifier A1. With switch arm of S2B against contact 1 of that switch, a feedback path for amplifier A1 is provided via resistor R18, transistor Q1, the switch arm S2A and its associated contact 1, and back to the negative input terminal of the amplifier. Switch arms S2A, S2B, and S2C are ganged so that movement of one of the switch arms against a particular numbered contact associated therewith moves the other switch arm to the same contact associated with that switch.

Transistor amplifier Q1 is placed in the feedback circuit of amplifier A1 to provide the latter amplifier with a logarithmic characteristic. In order to prevent the existence of temperature varying offset voltages at the output of transistor Q1, which is generally temperature sensitive, that transistor is placed in an oven in which the temperature is maintained at a constant value sufficiently above ambient temperature outside the oven to prevent changes in the amplifier output voltage as a consequence of changes in ambient temperature. Other temperature sensitive elements, such as amplifiers A2 and A3 and some of their associated circuit elements are also placed in the oven to reduce the possibility of errors resulting from temperature variations. The components of the circuit to be included in the oven are shown enclosed in a dotted line in the FIGURE of drawing.

Control of the oven temperature is established as follows. A heat sensor in the form of a thermistor RT1 is located in a bridge circuit having resistors R32, R33 and R34 as its other arms. High gain operational amplifier A2 has its input terminals connected to junctions at opposite diagonals of the bridge circuit, i.e., is connected across the bridge as a comparator to detector bridge unbalance. In the event that the oven temperature falls below the desired temperature value, the bridge becomes unbalanced and the output voltage of amplifier A2 goes positive to switch on transistor Q2 from its normally nonconductive state. Accordingly, current flows through heater resistors R20, R21, and R22 which are preferably physically disposed in the vicinity of transistor Q1. Thermistor RT1 is preferably also physically located in the vicinity of transistor Q1 within the oven, and particularly between transistor Q1 and resistor R22 to ensure highly sensitive temperature control. The power dissipation through resistors R20, R21 and R22 generates heat in the oven environment to appropriately change the value of thermistor RT1 to bring the bridge to a state of balance. At that point, the output of amplifier A2 returns to zero and turns off transistor Q2.

The output terminal of amplifier A1 is connected to the negative input terminal of output amplifier A3 via resistor R18, switch arm S2B and associated contact 1, and resistor R24. The latter resistor is also connected to the emitter electrode of transistor Q1 via a resistor R23 and the parallel combination of resistor R17 and diode CR1. Any offset voltage developed by transistor Q1 in the feedback path of amplifier A1 and occurring in the output voltage of the latter amplifier, is cancelled or reduced at the negative input terminal of amplifier A3 by appropriate adjustment of the movable tap of potentiometer R28, connected to the other input terminal of amplifier A3 via a resistor R27. In the preferred embodiment, amplifier A3 has a gain sufficient to yield a 1 volt output at output terminal J2 and a 1 millivolt output at output terminal J3. However, the gain of amplifier A3 may be adjusted to any extent necessary to produce a desired output voltage within the limits, of course, of the amplifiers and power supplies utilized for the electrometer amplifier circuitry. Potentiometers R36 and R37 between the output port of amplifier A3 and output terminals J2 and J3, respectively, are variable in magnitude to adjust the output of amplifier A3 to the desired range (in decades) of the logarithmic scale.

Linear amplification is selected by switching S2 through any of its positions denoted by contacts numbered 2–7, inclusive. The linear scales are thereby determined by the resistance of resistors R11, R12, R13, R14, R15, and R16. A divider circuit formed by resistors R19 and R25 from the common end of the linear amplifier adjusting resistors to a point of ground potential and having an intermediate junction connected in common to the contacts numbered 2 through 7 of switch S2B provides equalization of the offset voltage of transistor Q1.

In the input circuit of amplifier A3 the resistor R30 is connected to a point of reference potential (ground) when the arm of switch S2C, also ganged with the arms of switches S2A and S2B, resides against any of the contacts numbered 2 through 7, inclusive, to remove the offset compensation of transistor Q1 when any of the linear ranges are to be established by overall switch S2. An advantage of such an arrangement is that the same gain characteristic is retained for amplifier A3 for both linear and logarithmic functions.

The response time of the electrometer amplifier of the Figure is selected by the position of a switch S3 in the feedback path between the output port of amplifier A3 and its positive input terminal. With the switch arm of switch S3 in position against contact 2, as shown, the response time of the system is determined by resistance R29, connected between input and output of amplifier A3, and the various interelectrode capacitances that may be present in the circuit. With the switch arm S3 in position against contact 1, the capacitors C4, C6 and resistor R29 combine to provide a time constant preferably of approximately 1 second, whereas with S3 in the position numbered 3 the time constant is determined by series capacitors C5 and C7 and resistor R29 and is preferably an order of magnitude greater than that determined by position 1 of the switch arm, i.e., approximately 10 seconds.

In operation of the electrometer amplifier system of the FIGURE, for the logarithmic gain characteristic mode, switch arms S2A, S2B, and S2C are set against respective contacts 1. Negative-polarity input signal current to be measured is supplied to the center terminal of coaxial input jack J1 (the outer conductor of which may be grounded for shielding purposes) and the setting of the tap on potentiometer R8 is adjusted to reduce background currents appearing on the input signal. The input signal itself may be obtained from the electrical output of a chemical detector, such as a sulfur dioxide analyzer, for example, and may therefore be of extremely low level (provided low levels of that pollutant are present in the air sample under test); hence, the desire to have available a logarithmic amplification characteristic.

Maintenance of oven temperature above normal ambient temperature to which the circuitry outside the oven is exposed, is continued throughout operation of the system and is effective to substantially remove offset voltage variation with temperature of the output voltage of transistor Q1 in the feedback circuit of amplifier A1.

The amplified output signal of amplifier A1 is fed to amplifier A3 through resistor R18, switch arm S2B and associated contact 1, and resistor R24. Any offset voltage developed by transistor Q1 and appearing on the input signal to amplifier A3 via the connection of resistor R24 to the emitter of Q1, or via the feedback circuit of amplifier A1 if bucked out by appropriate adjustment of potentiometer R28. Readout of signal is available at output jack J2 or at output jack J3, depending on desired range (these two outputs being independently adjustable in terms of range), or from both of those output jacks.

For operation in the linear amplification mode, the switch arms S2A, S2B, and S2C are simply switched to contacts 2–7 of the respective switches according to gain desired.

We claim:

1. A logarithmic/linear electrometer amplifier, comprising: first and second high gain operational amplifiers connected in cascade, means associated with each of said amplifiers, respectively, for providing a separate feedback path between input and output of each of said amplifiers, means for supplying DC signal input current to a first of said amplifiers in said cascaded configuration, means associated with the means for supplying input current for selectively applying thereto an adjustable DC of opposite polarity to said DC signal input current to reduce undesired background current in said input current, a feedback circuit associated with said feedback path of said first amplifier only, arranged and adapted to establish for said first amplifier only a logarithmic response characteristic, said first amplifier including second feedback paths selective to provide said first amplifier with any one of a plurality of diverse linear amplifications, means in said feedback path of said second amplifier for selectively setting the response time of only said second amplifier, and means connecting plural output terminals in parallel to the output port of said second amplifier via separate diverse adjustable voltage dividers to simultaneously different ranges of values current reading for said amplifiers connected in cascade.

2. The combination according to claim 1, wherein said first mentioned a feedback circuit comprises a grounded base transistor amplifier having its emitter connected as its input and its collector connected as its output.

3. The combination according to claim 2, wherein is further provided means for maintaining said transistor in a controllably stabilized temperature environment.

4. The combination according to claim 1, wherein is included in the input circuit of said first amplifier means for selectively providing predetermined calibration currents to said first amplifier in substitution of said DC signal input.

5. An amplifier system comprising first and second high gain operational amplifiers connected in cascade, a first feedback path for providing said first amplifier with a logarithmic gain characteristic, a second feedback path for providing said first amplifier with any of a plurality of amplification scales of a linear gain characteristic, switch means connected to said first amplifier and to each of said first and second feedback paths for selectively providing feedback from output to input circuit of said first amplifier via one of said first and second feedback paths, means including a transistor amplifier associated with said first feedback path arranged for stabilizing the amount of feedback through said first feedback path, said last means including a constant temperature furnace enclosing said transistor amplifier, means connected to the output circuit of said second amplifier for providing dual outputs with separately adjustable ranges, said transistor amplifier being on a grounded base, emitter input configuration.

6. An amplifier system, comprising first and second high gain operational amplifiers connected in cascade, a first feedback path connectable to said first amplifier and arranged to provide said first amplifier only with a logarithmic gain characteristic, a second feedback path connectable to said first amplifier for providing said first amplifier with any of a plurality of linear gain characteristics, switch means connected to said first amplifier and to each of said first and second feedback paths for selectively connecting said first and second feedback paths between output and input circuits of said first amplifier, means associated with said first feedback path for temperature stabilizing the feedback therethrough, and means connected to the output circuit of said second amplifier for providing dual simultaneous outputs having separately adjustable ranges.

7. The invention according to claim 6, further including means applying DC input currents to said first amplifier for amplification by said amplifiers, and means in the input circuit of said second amplifier for inserting variable DC bucking currents into said first amplifier, said DC input currents and said DC offset currents being of opposite polarities.

8. The invention according to claim 6, further including means connected to the input circuit of said first amplifier for selectively applying any of a plurality of predetermined calibration currents to said first amplifier as an input therefore in substitution for said bucking currents and DC input currents.

9. A logarithmic amplifier including an amplifier having an input lead and an output lead, a negative feedback circuit extending from said output circuit to said input circuit, said feedback circuit including a transistor amplifier and means including a temperature controlled oven containing said transistor amplifier and arranged to maintain said transistor amplifier at a fixed absolute temperature which is higher than ambient temperature, whereby to stabilize the amplitude of feedback of said logarithmic amplifier, said transistor amplifier being biased to provide said logarithmic amplifier with a logarithmic gain characteristic, said transistor amplifier including a grounded base, an emitter and a collector, said emitter and collector being connected in said feedback circuit in a conductive direction taken between said output circuit and said input circuit, said means including a temperature controlled oven including a temperature sensitive bridge, another amplifier responsive to imbalance of said bridge, and a further single transistor amplifier having a grounded emitter, a base connected to the output of said another amplifier and having a heat dissipative resistive collector load, wherein said bridge, said another amplifier, said further amplifier and said heat dissipative resistive collector load are included within said oven.

10. The combination according to claim 9, wherein is provided means for inserting a DC signal of one polarity into said input lead and means for inserting an adjustable DC bucking current into said input lead in common with said DC signal of one polarity, said bucking current being sufficiently high level to reduce in magnitude high level background currents which are components of said DC signal of one polarity to enable effective amplification of small components of said DC signal of one polarity.

11. The combination according to claim 10, wherein is further provided means for inserting calibration currents into said input current in substitution for both said DC signal of one polarity and said bucking current.

12. The combination according to claim 11, wherein is further included, in cascade with said logarithmic amplifier, a linear amplifier having constant gain and having a feedback circuit including an RC time constant of selectable response time value.

* * * * *